United States Patent [19]

Swiatek et al.

[11] Patent Number: 5,607,584
[45] Date of Patent: *Mar. 4, 1997

[54] FILTER CELLS PROVIDING LIFTING MEANS AND RELATED METHODS

[75] Inventors: Frank Swiatek, Stafford Springs; Richard Leavitt, deceased, late of New Britain, by Robert Leavitt, legal representative; Donald Chanski, Willimantic; Ronald V. Repetti, Guilford; Drew Willoughby, Rocky Hill, all of Conn.

[73] Assignee: Cuno Incorporated, Meriden, Conn.

[*] Notice: The term of this patent shall not extend beyond the expiration date of Pat. No. 5,482,624.

[21] Appl. No.: 538,729

[22] Filed: Oct. 3, 1995

Related U.S. Application Data

[63] Continuation-in-part of Ser. No. 317,911, Oct. 4, 1994, Pat. No. 5,482,624.

[51] Int. Cl.⁶ ........................................... B01D 35/00
[52] U.S. Cl. .................. 210/238; 210/323.1; 210/443; 210/453; 210/454; 210/460; 210/470
[58] Field of Search ........................... 210/232, 237, 210/238, 323.1, 437, 443, 453, 454, 460, 470, 471

[56] References Cited

U.S. PATENT DOCUMENTS

| | | | |
|---|---|---|---|
| 2,353,433 | 7/1944 | Auberschek | 210/238 |
| 2,731,155 | 1/1956 | James | 210/470 |
| 2,757,802 | 8/1956 | Schmid | 210/237 |
| 2,781,914 | 2/1957 | De Voe | 210/238 |
| 3,666,107 | 5/1972 | Boggs et al. | 210/238 |
| 4,007,113 | 2/1977 | Ostreicher | 210/23 |
| 4,007,114 | 2/1977 | Ostreicher | 210/23 |
| 4,132,641 | 1/1979 | Elsworth | 210/238 |
| 4,305,782 | 12/1981 | Ostreicher et al. | 162/181 |
| 4,309,247 | 1/1982 | Hou et al. | 162/149 |
| 4,347,208 | 8/1982 | Southall | 264/229 |
| 4,361,486 | 11/1982 | Hou et al. | 210/722 |
| 4,617,128 | 10/1986 | Ostreicher | 210/679 |
| 4,669,167 | 6/1987 | Asterlin | 210/238 |
| 4,881,313 | 11/1989 | Artinyan et al. | 29/163.8 |
| 4,921,606 | 5/1990 | Goldman | 210/470 |
| 5,045,194 | 9/1991 | Gershenson | 210/470 |
| 5,217,610 | 6/1993 | McClain et al. | 210/238 |
| 5,246,581 | 9/1993 | Goldman | 210/453 |
| 5,328,606 | 7/1994 | Warren et al. | 210/238 |
| 5,417,855 | 5/1995 | Gershenson | 210/453 |
| 5,482,624 | 1/1996 | Swiatek et al. | 210/238 |

*Primary Examiner*—Stanley S. Silverman
*Assistant Examiner*—Theodore M. Green
*Attorney, Agent, or Firm*—Renner, Kenner, Greive Bobak, Taylor & Weber

[57] ABSTRACT

Removable filter cartridge assemblies (10) for housings (28) having a removable member (101, 130) to provide access to the interior (102, 136) of the housing and an inlet (108, 134) and an outlet (109, 135) to and from the interior thereof (102, 136) comprising at least one filter cell (12) through which fluids are passed for filtration, the cell having a central aperture (18) therethrough for the passage of fluid, separate from the fluid within the housing; opposed disks of filtration media (16), spaced apart and defining upper (16U) and lower (16L) surfaces of the cell emanating radially from the central aperture; and, an outer peripheral edge (14) circumscribing the cell; first and second retainer ring members (22) securably disposed on the upper and lower surfaces of said filter cell, open to and concentric with the central aperture, said first retainer ring members being contiguous with the outlet of the housing; and lifting means (42, 50, 80, 90) communicable with one of the retainer ring members for movement of the filter cell into and out of the filter housing. The present invention also provides a device for lifting and carrying a filter cell (12) comprising retainer ring members (22); and a lifting device (42, 50, 80, 90) in communication with said retainer ring members, as well as a device for lifting and carrying a filter cell (12) comprising an outer peripheral edge (14) provided by said filter cell; and a lifting device (70) in communication with said outer peripheral edge. The present invention also provides methods for the assembly of a cell-type filter cartridge device disposed within a filter housing and a method for removing a filter cell cartridge assembly from a filter housing.

11 Claims, 8 Drawing Sheets

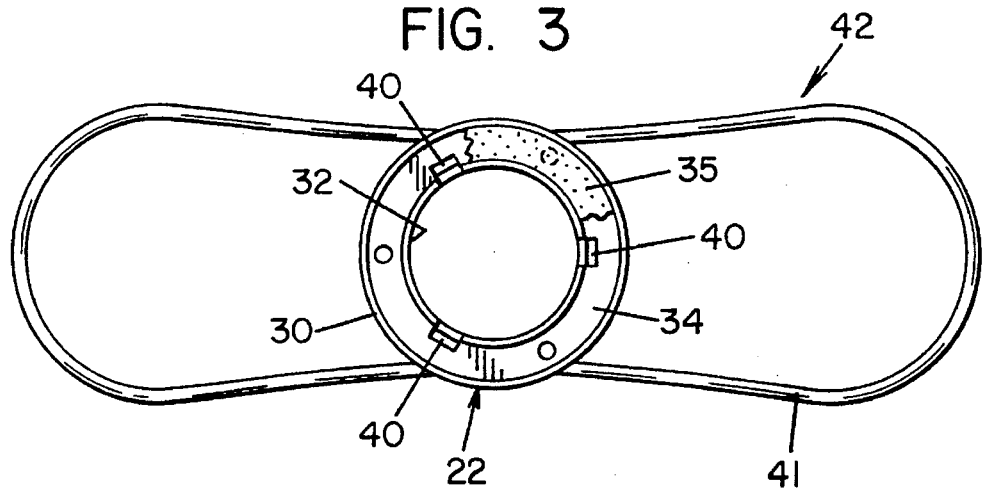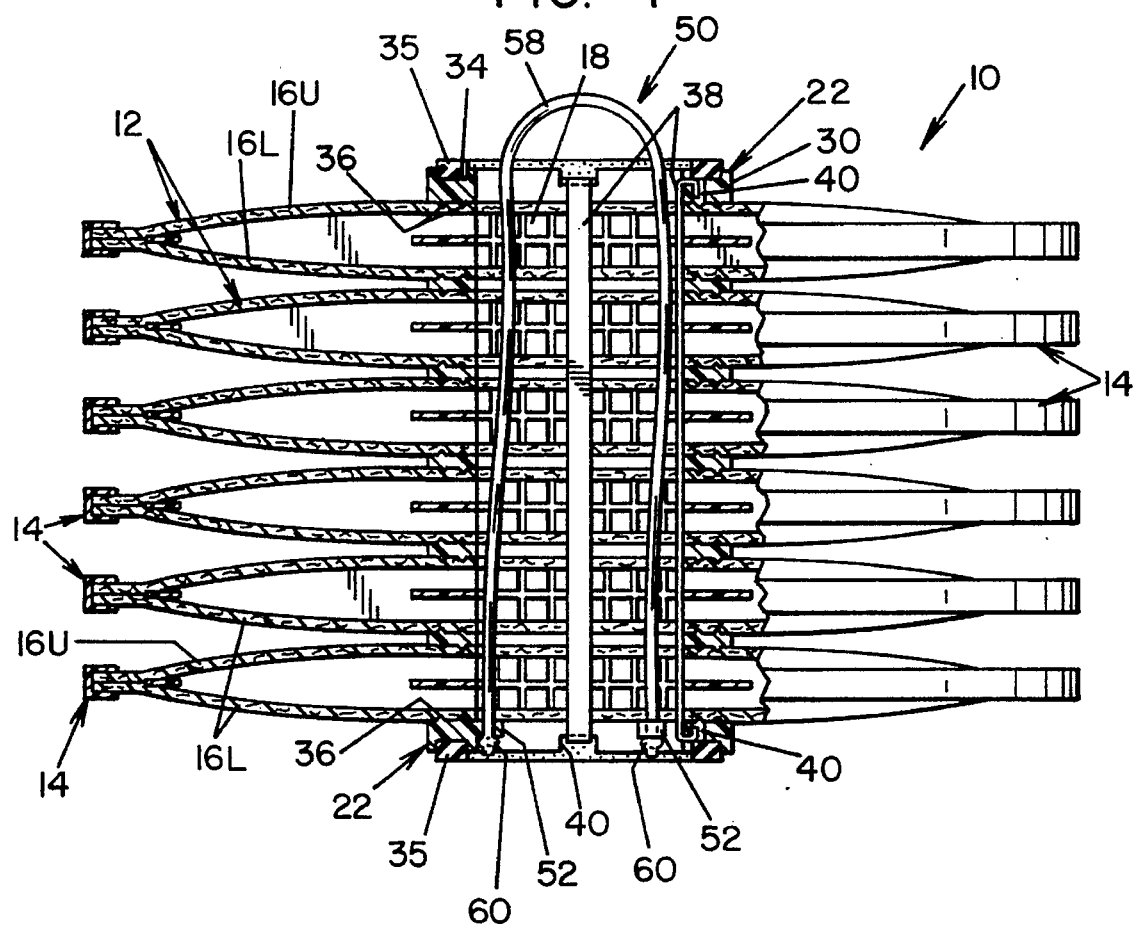

FILTER CELLS PROVIDING LIFTING MEANS AND RELATED METHODS

CROSS-REFERENCE TO RELATED APPLICATION

This application is a continuation-in-part of U.S. Ser. No. 08/317,911, filed Oct. 4, 1994, now U.S. Pat. No. 5,482,624.

TECHNICAL FIELD

The present invention is related in general to cell-type filter cartridges having means to assist in the removal thereof from a filter housing in which the cartridges are held. More particularly, the present invention provides a handle to assist in removing cell-type filter cartridges from a filter housing in such a manner that the integrity of the cartridge or cartridges is maintained. Use of the filter cartridge handle in this manner is beneficial in preventing damage to the filter cartridge. Methods are also provided for the assembly of a cell-type filter cartridge device and for removing cell-type filter cartridges from their filter housing.

BACKGROUND ART

Cell-type filter cartridges have long been known and are increasingly used in a variety of situations. These type of filter cartridges are typically fabricated from individual cells generally having two layers of filter media separated from each other. Liquid typically flows from the outside of the filter medium into the space between the layers of the filter media toward the central portion of the cell. A significant advantage to cell-type filter cartridges is that the surface area of filter material is quite large when compared to the total volume of an assembled cell-type filter cartridge.

Disposed between each filter medium is a separator which is typically formed in the shape of disks having ribs radially extending from the central aperture in a spoke-like pattern. In addition to separating the two layers of filter media, it provides for fluid flow from the filter media toward the central aperture of the filter media.

The separator disk has stiffening members formed at the central aperture of the cell which are attached to a plurality of separating ribs to provide a rigid, box-like structure sufficient to impart substantial cantilever strength to the ribs. Further, one of the stiffening disks is positioned proximate the ends of the separator ribs in order to act as a loadbearing surface to prevent media intrusion of the filtering medium and to prevent blocking the area of the flow path with the filtered liquid. Accordingly, one distinct advantage in this type of separator is that during backwashing or reverse flow (i.e., fluid flow from the central aperture of the filter cell out toward the surface of the filter medium) damage to the filter media is minimized or ameliorated.

Filter cartridges use a variety of filter media for filtering many fluids. Examples of such media and uses may be found, for example, in U.S. Pat. No. 4,617,128 "Particulate Filter Aid, Filter Bed Process" dated Oct. 14, 1986, to Ostreicher; U.S. Pat. No. 4,309,247 "Filter and Method of Making Same" dated Jan. 5, 1982 to Hou et al.; U.S. Pat. No. 4,305,782 "Filter and Method of Making Same" dated Dec. 15, 1981 to Ostreicher et al.; U.S. Pat. No. 4,007,113 "Particulate Filter Medium and Process" dated Feb. 8, 1977 to Ostreicher; and U.S. Pat. No. 4,007,114 "Fibrous Filter Medium and Process" dated Feb. 8, 1977 to Ostreicher. All of the foregoing patents are incorporated herein by reference.

Use of a cell-type filter cartridge may be also found in U.S. Pat. No. 4,361,486 "Filter Media, Method for Oxidizing and Removing Soluble Iron, Method for Removing Inactivating Microorganisms and Particulate Filter Aid" issued Nov. 30, 1982 to Hou et al. which is incorporated herein by reference.

A process for manufacturing filter cells is described in U.S. Pat. No. 4,347,208 "Method of Making filter Cell Having Sealed Periphery" issued Aug. 31, 1982 to Southall. In this patent, a filter cell cartridge is described which comprises a plurality of filter cells. Each of the filter cells is comprised of filter media having a conical separator therebetween with the periphery or edges of the filter cell being held together and sealed by an injection-molded flange.

A method for disposing a netting or mesh on the outside of the filter material is disclosed in U.S. Patent No. 4,881,313 "Method of Forming a Cell Filter With an Exposed Surface" issued to Artinyan et al. In this patent, the surface area of filter exposed to unfiltered fluid has disposed thereon a netting thereby preventing flaking, cracking and the like of filter media during backflow or cleaning operations. The netting is secured to the cell by a molded circumferential retainer and a circumferential centrally disposed ring.

Generally, all of the aforementioned filter cartridges perform as anticipated during normal operating conditions. As can be expected after extended use, the filtering capacity of the filter media diminishes accordingly. The filter cartridges are replaced by grasping the periphery or edge of the uppermost filter cell, and then carefully lifting the attached filters away from the filter housing. This method relies on the strength of the individual wet cells as well as that of the bands which interconnect the multiple filter cells, to prevent any one of the attached filter cells from breaking apart. Alternatively, if the construction of the filter housing permits, the bottom filter may be grasped around its periphery and then removed by carefully lifting the cartridge up and out of the filter housing. Both of the aforementioned methods are problematic because of the increased weight of a wet filter cartridge as compared to the weight of a dry filter cartridge. This increased load is generally concentrated toward the center of the cartridge, thus resulting in the likelihood of the cartridge separating during the lifting operation.

A wet filter cartridge that breaks during removal from a filter housing causes several problems. Primarily, if the cartridge breaks while still in the vicinity of the housing, the particulate matter removed by the filters may re-enter the housing, thus requiring additional cleaning operations in and around the housing.

Although it is common to provide a handle for lifting and carrying bulky items, the prior art does not disclose a handle that provides a method of attaching the handle to a wet, bulky, used filter cartridge. Nor does the prior art provide a filter cartridge with a handle integrally disposed thereon. The present invention provides such a handle, thereby increasing the convenience to and productivity of the technician utilizing the invention.

DISCLOSURE OF THE INVENTION

It is therefore, an object of the present invention to provide a convenient method for removing a filter cell cartridge assembly from a filter housing.

It is another object of the present invention to provide a handle for lifting and carrying a filter cartridge that is integral therewith.

It is yet another object of the present invention to provide a handle for lifting and carrying a filter cartridge that is secured thereto prior to removal of the cartridge from the filter housing.

It is yet another object of the present invention to provide a convenient method for the installation of a cell-type filter cartridge device in the filter housing.

It is still another object of the present invention to provide lifting means for a filter cartridge so as to facilitate the replacement thereof in filter housings.

At least one or more of the foregoing objects, together with the advantages thereof over the known art relating to methods and handles for lifting and carrying filter cartridges, and which shall become apparent from the specification which follows, are accomplished by the invention as hereinafter described and claimed.

In general the present invention provides removable filter cartridge assemblies for housings having a removable member to provide access to the interior of the housing and an inlet and an outlet to and from the interior thereof comprising at least one filter cell through which fluids are passed for filtration, the cell having a central aperture therethrough for the passage of fluid, separate from the fluid within the housing; opposed disks of filtration media, spaced apart and defining upper and lower surfaces of the cell emanating radially from the central aperture; and, an outer peripheral edge circumscribing the cell; first and second retainer ring means securably disposed on the upper and lower surfaces of the filter cell, open to and concentric with the central aperture, said first retainer ring means being contiguous with the outlet of the housing; and lifting means communicable with one of the retainer rings for movement of the filter cell into and out of the filter housing.

The present invention also provides removable filter cartridge assemblies for housings having a removable member to provide access to the interior of the housing and an inlet and an outlet to and from the interior thereof comprising a plurality of cartridges, each said cartridge having at least one filter cell through which fluids are passed for filtration, the cells having a central aperture therethrough for the passage of fluid, separate from the fluid within the housing; opposed disks of filtration media, spaced apart and defining upper and lower surfaces of the cells emanating radially from the central aperture and providing upper and lower surfaces of the cells and, an outer peripheral edge circumscribing each cell; first and second retainer ring means securably disposed on the upper and lower surfaces of at least one filter cell within each of the cartridges, open to and concentric with their respective central apertures, the first retainer ring means, provided by one of the cartridges, being contiguous with the outlet of the housing; and lifting means communicable with one of the retainer ring means for movement of the filter cell into and out of the filter housing.

The present invention also provides removable filter cartridge assemblies for housings having a removable member to provide access to the interior of the housing and an inlet and an outlet to and from the interior thereof comprising at least one filter cell through which fluids are passed for filtration, the cell having a central aperture therethrough for the passage of fluid, separate from the fluid within the housing; opposed disks of filtration media, spaced apart and defining upper and lower surfaces of the cell emanating radially from the central aperture and providing upper and lower surfaces respectively of the cartridge; and, an outer peripheral edge circumscribing the cell; and lifting means extending from the outer peripheral edge for movement of the filter cell into and out of the filter housing.

The present invention also provides means for lifting and carrying a filter cell comprising retainer ring means; and lifting means in communication with the retainer ring.

The present invention also provides means for lifting and carrying a filter cell comprising an outer peripheral edge provided by the filter cell; and lifting means in communication with the outer peripheral edge.

The present invention also provides a method for the assembly of a cell-type filter cartridge device disposed within a filter housing and having a removable member to provide access to the interior of the housing and an inlet and an outlet to and from the interior thereof, comprising the steps of providing at least one filter cell through which fluids are passed for filtration, the cell having a central aperture therethrough for the passage of fluid, separate from the fluid within the housing; opposed disks of filtration media, spaced apart and defining upper and lower surfaces of the cell emanating radially from the central aperture; and, an outer peripheral edge circumscribing the cell; and first and second retainer ring means securably disposed on the upper and lower surfaces of the filter cell, open to and concentric with the central aperture, the first retainer ring means being contiguous with the outlet of the housing; providing lifting means communicable with one retainer ring means for movement of the filter cell into and out of the filter housing; depositing the filter cell into the filter housing via the lifting means; fastening the removable member to the filter housing; and effecting a seal against the second retainer ring means, whereby the fluid within the central aperture will be directed toward the outlet.

The present invention also provides a method for the assembly of a cell-type filter cartridge device disposed within a filter housing and having a removable member to provide access to the interior of the housing and an inlet and an outlet to and from the interior thereof comprising the steps of providing at least one filter cell through which fluids are passed for filtration, the cell having a central aperture therethrough for the passage of fluid, separate from the fluid within the housing; opposed disks of filtration media, spaced apart and defining upper and lower surfaces of the cell emanating radially from the central aperture; and, an outer peripheral edge circumscribing the cell; providing lifting means extending from the outer edge, for movement of the filter cell into and out of the filter housing; depositing the filter cell into the filter housing via the lifting means; and fastening the removable member to the filter housing.

The present invention also provides a method for removing a filter cell cartridge assembly from a filter housing having a removable member to provide access to the interior of the housing and an inlet and an outlet to and from the interior thereof; the cartridge assembly providing at least one filter cell through which fluids are passed for filtration, the cell having a central aperture therethrough for the passage of fluid, separate from the fluid within the housing; opposed disks of filtration media, spaced apart and defining upper and lower surfaces of the cell emanating radially from the central aperture and, an outer peripheral edge circumscribing the cell and, first and second retainer ring means securably disposed on the upper and lower surfaces of the filter cell, open to and concentric with the central aperture, said first retainer ring means being contiguous with the outlet of the housing, comprising the steps of detaching the removable member from the filter housing; securing means for lifting to one retainer ring; and lifting the filter cell out of the filter housing with the lifting means.

BRIEF DESCRIPTION OF THE DRAWINGS

FIG. 3 is a top plan view of a handle which can be attached to or integrally molded to a retainer ring, which is interconnected with a top filter of the filter cell cartridge assembly;

FIG. 4 is a side elevation, partially in section, of a filter cell cartridge assembly of the type employed for practice of the present invention with a handle in communication with a bottom retainer ring of a filter cell cartridge assembly;

PREFERRED EMBODIMENT FOR CARRYING OUT THE INVENTION

Figure 1:
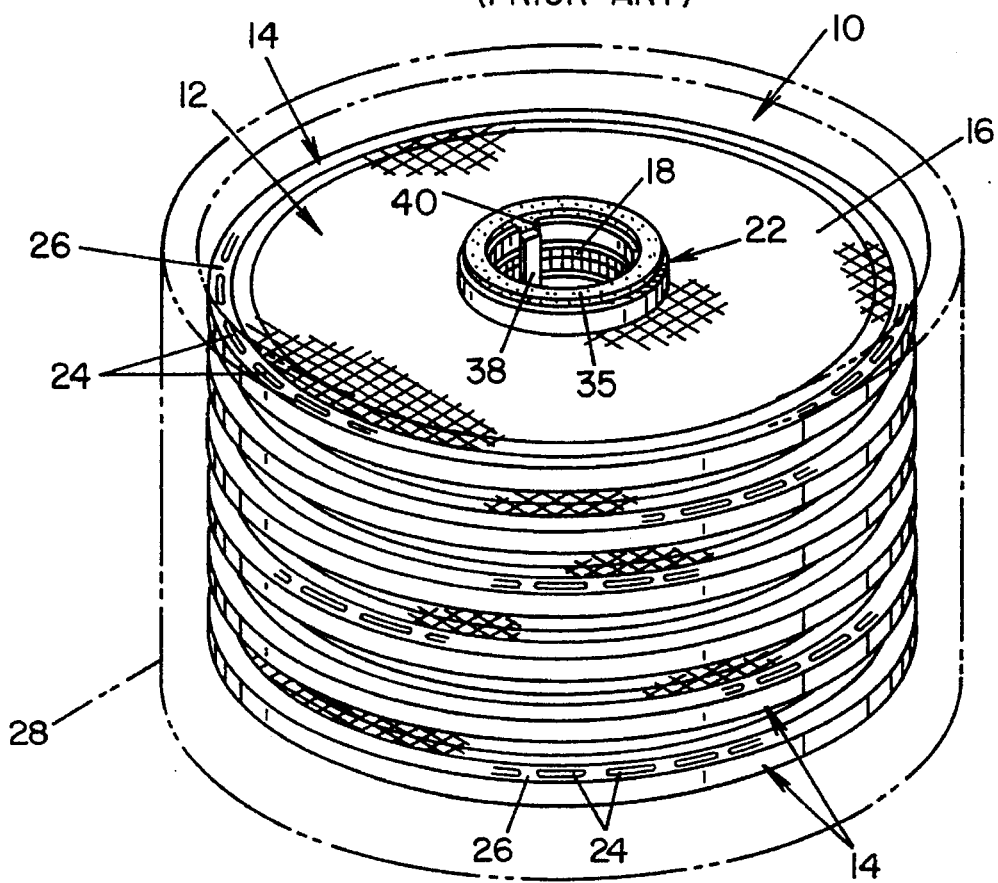
FIG. 1 is a perspective of a filter cell cartridge assembly of the type employed for practice of the present invention.
Figure 2:
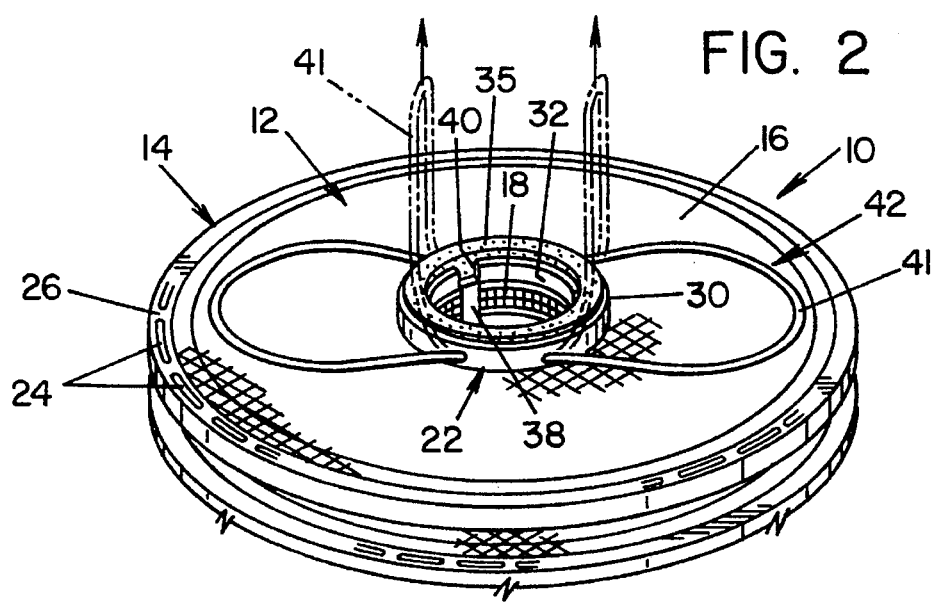
FIG. 2 is a perspective view of a portion of the filter cell cartridge assembly of the type employed for practice of the present invention with a handle in communication therewith.

With reference to the drawings, and in particular to FIGS. 1 and 2, the device employed for practice of the present invention is a filter cartridge assembly, referred to generally by the numeral 10. The assembly 10 will include at least one filter cell 12, and typically will consist of a plurality of filter cells interconnected as shown in FIG. 1.

As is well known in the art and as shown in FIG. 1, the filter cell 12 has an edge 14 that extends completely around the outer periphery thereof to securably fasten the frangible ends of the filtration media 16. The latter comprises opposed disks of media 16 which are identical, one forming the upper surface 16U, of the cell and the other forming the lower surface 16L, of the cell. In the preferred embodiment, the edge 14 is a plastic, injection molded component. Although the filter cell 12 is shown having a circular construction, it should be appreciated that the shape thereof may be of any configuration desired to achieve the desired filtration process. As revealed in the incorporated patents, the filtration media 16 is used for the introduction of unfiltered fluid (not shown) which passes therethrough and exits through the center aperture or core 18. Disposed at either end of the assembly 10 is a retainer ring assembly, indicated generally by the numeral 22, and sometimes referred to herein as the retainer ring 22. The edge 14 has a plurality of elongate slots or apertures 24 having spacer portions 26 disposed therebetween. The entire filter cartridge assembly 10 is disposed inside a chamber or filter housing 28, having an unfiltered fluid inlet for the chamber and a filtered fluid outlet connected to either one or both retainer ring assemblies 22.

With reference to FIG. 2, there is shown a perspective view of the retainer ring assembly 22, that is disposed at either end of the filter assembly 10. The retainer ring assembly 22 comprises an end member 30, which is typically an annular component, that has an interior 32, concentric with the aperture 18. The end member 30 also has an annular trough 34 for receiving a gasket 35. The gasket 35 will provide a sealing interface between the retainer ring 22 and the inlet or outlet of the filter housing. Located opposite the side of the end member 30 that has the annular trough 34, are a plurality of annular ribs 36 (see FIGS. 4, 5 and 7) to provide continuous sealing edges and a fluid-tight fitting between the end member and the surface of the filtration media 16.

A plurality of bands 38 engage slots 40 in the retainer ring assembly 22 and extend from the top retainer ring assembly to the bottom retainer ring assembly and are used to form a rigid filter cell assembly 10. The bands 38 are preferably made of stainless steel, although another suitable material may be utilized. Further, it is possible to utilize a plurality of threaded bolts or the like extending through the filter cell assembly and suitably attached to the retainer ring assemblies 22 to form a rigid filter cell assembly 10.

Still referring now to FIGS. 2 and 3 it can be seen that integral with the top retainer ring assembly 22 is a lifting strap 41 which together provides lifting means 42. The material for the lifting strap, which is typically made of plastic, is rigid enough to support the weight of a wet filter cartridge assembly 10, while still allowing the strap 41 to be flexible for when it is manipulated to lift the assembly out of the filter housing 28. In the preferred embodiment, the lifting strap 41 has an oval configuration; however, it should be appreciated that the strap 41 may be configured in any shape that is conducive to lifting a wet cartridge assembly 10. Furthermore, although the strap 41 is shown integrally molded with the retainer ring 22, it is conceivable that lateral holes may extend through the end member 30 for receiving a flexible lifting strap which may then be used to lift the cartridge assembly 10. The opposing ends of such a lifting strap can be joined together by means of an electrical connector (not shown) or other comparable means.

From the above description of the preferred embodiment the advantages thereof over the prior art should be readily apparent. As discussed in the background art, the wet filter cartridge assembly is removed from the filter housing by grasping the edge of the filter cells and lifting out. Unfortunately, the wet filter cells can be difficult to grasp and may tend to break when subjected to such manipulation. Because the lifting forces are directed around the periphery of the assembly and the majority of the load of the cartridge is directed toward the center thereof, the likelihood of a cartridge breaking during this method of lifting is increased.

There are several unfortunate consequences when a filter cartridge assembly breaks during removal. Primarily, unwanted filter material may enter either the inlet or outlet of the filter housing. Thus, the technician responsible is required to spend additional time cleaning the housing. Furthermore, the entire filtration system must be flushed, thus adding expensive downtime to the attendant manufacturing process. Not only, does the present invention tend to eliminate these problems, but perhaps most importantly, it provides a means that makes filter cartridge removal easier than it has been.

Figure 5:
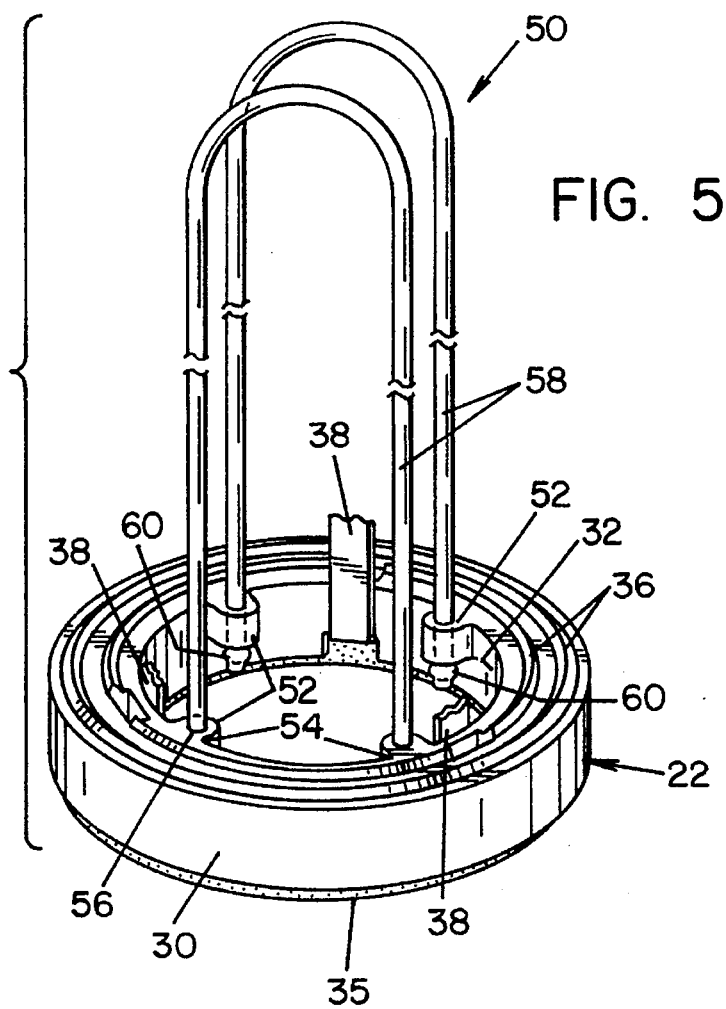
FIG. 5 is an exploded view of a handle interconnected to the bottom retainer ring of a filter cell cartridge assembly.

Of course, similar embodiments may be utilized to obtain the desired result of easy removal of a filter cartridge assembly. As seen in FIGS. 4 and 5, an alternative lifting means is depicted for lifting the cartridge assembly 10 up by the bottom retainer ring 22, and is generally designated by the numeral 50.

As best shown in FIG. 5, the interior 32 of the bottom retainer ring 22 has a plurality of inwardly extending bosses 52. A fillet 54 will provide a transitional area between each side of the boss 52 to the interior 32. It should be appreciated that there are an even number of bosses 52 disposed on the interior 32, and while the preferred number of bosses is four, a minimum of two should suffice. Moreover, each boss carries a hole 56.

At least one strap or handle 58 is affixed to a boss via the hole 56 and is extended through the entire length of the aperture 18. As depicted in FIG. 5, a handle 58 comprising a single strap is looped through the aperture 18 and both ends are affixed within opposed holes 56. Of course, the length of each handle 58 is dependent upon the length of the filter cartridge assembly 10. Ideally, the length of the handle 58 is such that a sufficient amount will extend out from the top retainer ring assembly 22 so as to provide an adequate length for manipulating the filter cartridge assembly 10. Typically, each handle 58 will be a flexible plastic rod with the necessary tensile strength for lifting the wet filter assembly 10. Furthermore, the diameter of the plastic rod is less than the diameter of the hole 56. It should also be appreciated that the handle 58 could be a stranded or solid steel wire or other similar material. Each end of the handle 58 is inserted through the hole 56 and deformed to create a head 60 that has a diameter larger than the hole 56. Other methods of deforming the handle 58, such as tying a knot or crimping a lug thereon, may also be used. In order to prevent the handles 58 from slipping down, a plastic friction-fit bushing, stainless steel clip or the like (not shown), can be positioned immediately above the bosses 52, as will be appreciated by those skilled in the art.

Once each end has been deformed, the handles 58 may be grasped to lift the filter cartridge assembly 10 out of the filter housing. In addition to the aforementioned benefits of lifting the cartridge assembly 10 with a handle, this bottom lifting variation reduces the possibility of the bottom filter cell sticking to either the inlet or the outlet of the filter housing. As those skilled in the art will appreciate, if the cartridge assembly 10 breaks away from the bottom filter cell, the likelihood of distributing the filtered material about the filter housing is greatly increased. Furthermore, lifting a cartridge assembly 10 by the bottom retaining ring 22 greatly increases the stability of the assembly during the lifting process.

Figure 6:
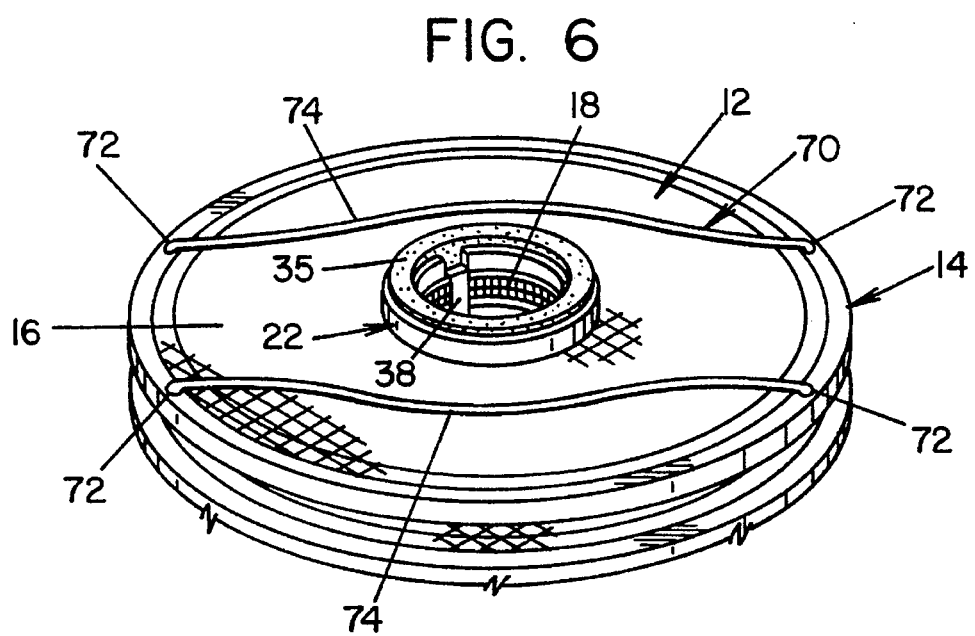
FIG. 6 is a perspective view of a handle strap integrally molded to the outer periphery of the top filter of a filter cell cartridge assembly.

In a third preferred embodiment as shown FIG. 6, integral with the molded edge 14 of a top filter cell 12, is a lifting strap, generally designated by the numeral 70. The lifting strap 70 comprises ends 72 integrally connected to the edge 14 with an interconnecting handle 74 therebetween. As illustrated in FIG. 6, it should be appreciated that the curvature of the handle 74 is such that there is enough clearance between the handle 74 and the filtration area 16 for the technician to insert his or her hands to lift the cartridge assembly 10 out of the filter housing. It should further be appreciated that there may be more than one lifting strap 70 integrally molded to the outer edge 14. Furthermore, in addition to the handle 74 being connected at both ends to the edge 14, a center portion of the handle may also be connected to the retainer ring 22. This center connection would provide additional stability during the lifting operation. Of course, the lifting strap 70 is of the same material as the edge 14, typically this material is made of a rigid yet flexible plastic. Moreover, the lifting straps 70 are configured such that they will not interfere with the normal operation of the filter housing.

Figure 7:
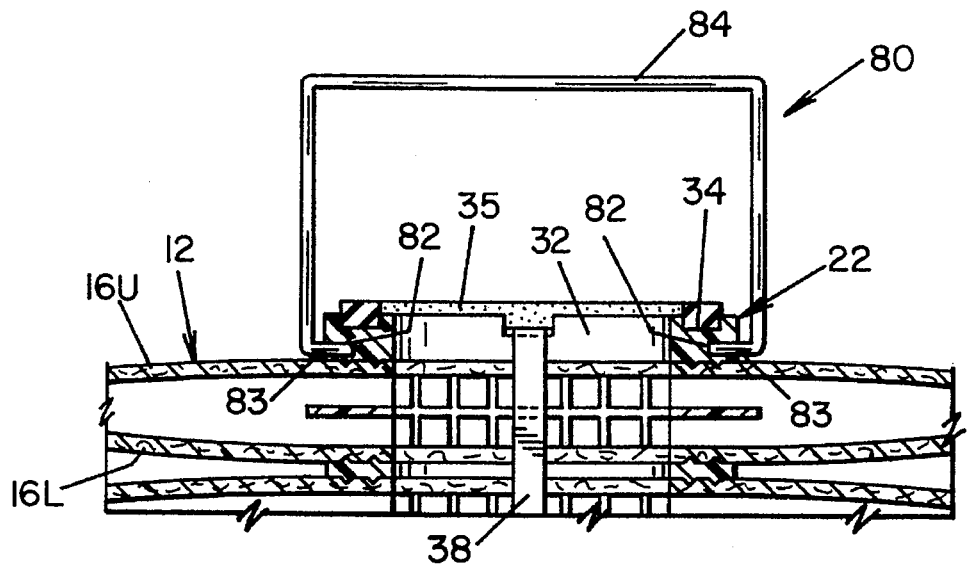
FIG. 7 is a partial cross sectional view of an upper retainer ring with a lifting handle affixed thereto to be used in lifting and carrying a filter cell cartridge assembly.

In a fourth embodiment, a ring strap or handle generally designated by the numeral 80, is shown in FIG. 7. The top retainer ring 22 is configured as in the previous embodiments, however, a pair of diametrically opposed recesses 82 are provided on the exterior thereof. The recesses 82 are configured so as to receive the opposed ends 83 of a lifting handle 84. It should be appreciated that the lifting handle 84 may be inserted into and received by the recesses 82. Accordingly, the filter cartridge assembly 10 is lifted away from the inlet or outlet with which it is in cooperation. The material of the lifting handle 84 is made of a suitable material such as spring steel or plastic. In other words, the lifting handle 84 is made of a material flexible enough to be inserted into the recesses 82, yet strong enough to lift a wet filter cartridge assembly 10.

Of course, the ring 22 is sufficiently flexible to allow the installation of handle ends 83 therein. During use, the lifting strap can be rotated out of the way in order to accommodate assembly and closure of the cartridge or, it can be removed from the cartridge altogether, and re-inserted at the next instance the cartridge is to be removed from the housing.

Figure 8:
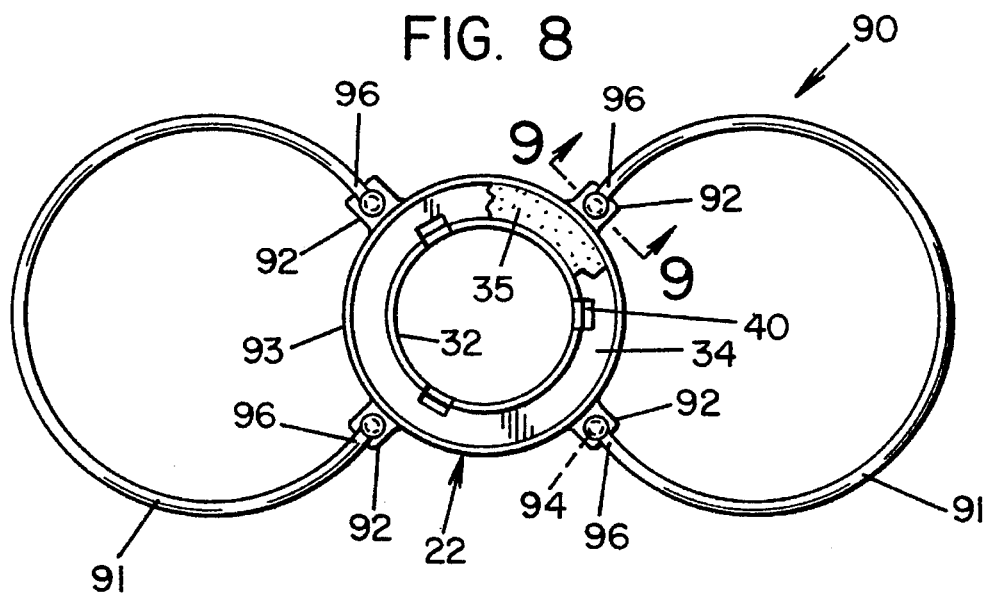
FIG. 8 is a top plan view of alternative embodiment handle which can be attached to a retainer ring, which is interconnected with a top cell of the filter cell cartridge assembly.
Figure 9:
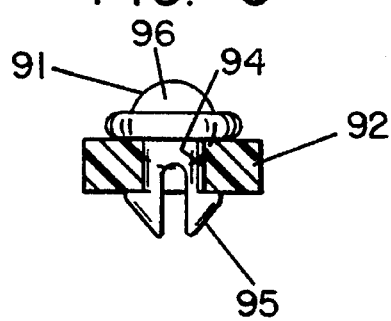
FIG. 9 is a cross-section taken substantially along line 9—9 of FIG. 8.

With reference to FIGS. 8 and 9, a fifth embodiment is provided somewhat similar to the lifting strap 41 depicted in FIGS. 2 and 3. In particular, lifting means 90 comprises twin lifting straps 91 and a modified top retainer ring assembly 22. The latter is made with a plurality of tabs 92, extending radially outwardly from the outer surface 93 of retainer ring 22, each of which carries an aperture 94 for receipt of a pointed foot member 95. Foot members 95 extend perpendicularly from the opposed ends 96 of lifting straps 91 and are joined to the retainer ring 22 by engagement with the apertures 94. The material for the lifting straps 91, which are typically made of plastic, is rigid enough to support the weight of a wet filter cartridge assembly 10, while still allowing the straps 91 to be flexible for manipulation in conjunction with lifting the assembly out of the filter housing 28. In the preferred embodiment, the lifting straps 91 are mounted in a fashion to provide twin opposed ovals; however, it should be appreciated that the straps 91 may be configured in any other shape that is conducive to lifting a wet cartridge assembly 10. Furthermore, although the straps 91 are shown as removably attached to the retainer ring 22, it is to be understood they could as well be integrally molded therewith and therefore no attempt has been made to depict such an embodiment.

Figure 10:
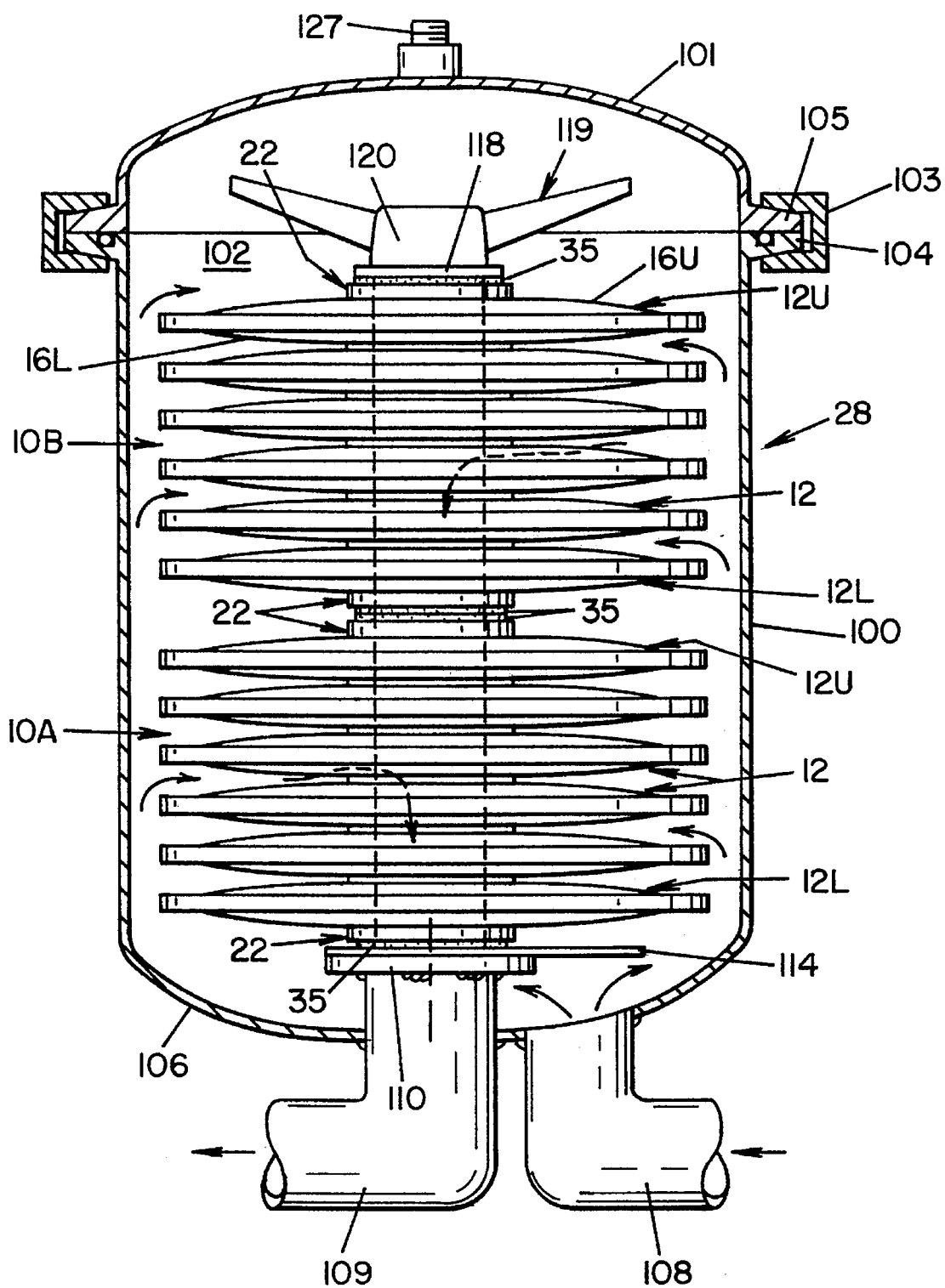
FIG. 10 is a side elevation, partially in section, depicting two filter cell cartridge assemblies within a conventional housing of the type employed for filtering with such filter media.

Having thus, described the various lifting means that can be employed according to the present invention, a more detailed description of a conventional housing for the filter cartridge assemblies 10 is provided next. Referring first to FIG. 10 and in conjunction with FIG. 11, the housing 28 is shown in cross-section. It includes a cylindrical body or sump 100 and removable cover 101, in order to gain access to the interior 102, of the housing 28. The cover 101 can be affixed in a variety of conventional manners, one being via an external circumferential clamp member 103, which engages matingly opposed circumferential flange members 104 and 105, from the body and cover members, respectively. While the housing depicted is opened by removal of a top cover, it is to be understood that the body member could include the top enclosure and be removably affixed to a base member and suitably clamped together. In either instance, and, as depicted in the drawings, the base 106 of the housing 28 provides an inlet pipe 108 into the housing and an outlet pipe 109 for removal of filtrate, both of which are welded or otherwise sealingly engaged with respect to the housing 28.

Figure 11:
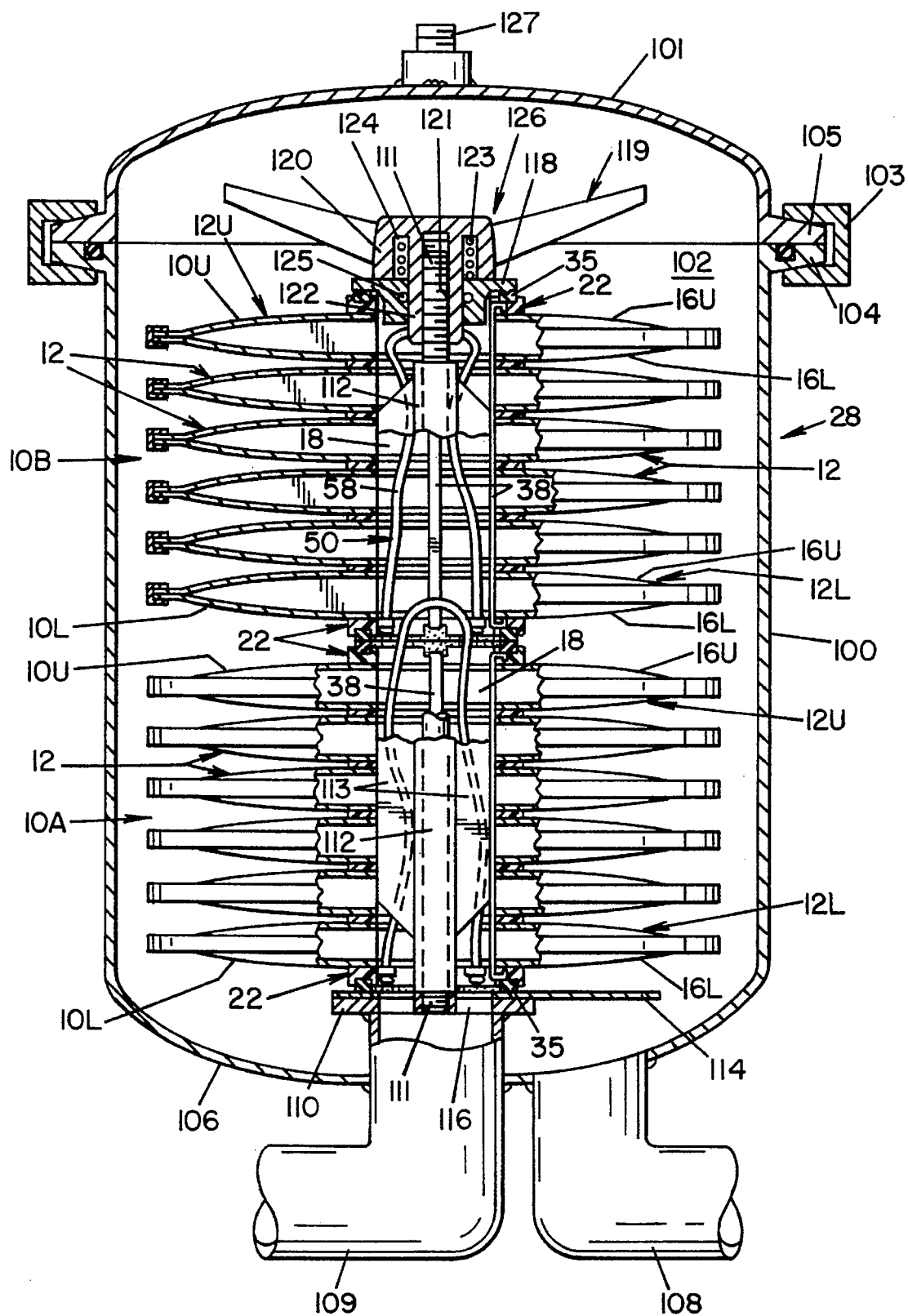
FIG. 11 is a side elevation, partially in section, depicting two filter cell cartridge assemblies within a conventional housing similar to FIG. 10, and depicting handles in communication with the bottom retainer ring of each filter cell cartridge assembly.

Referring additionally, to FIG. 11 for greater detail, the outlet pipe 109 carries a rigid base plate 110, upon which the filter medium is supported within the housing. The base plate 110 provides a threaded bore for the receipt of a threaded shaft 111 which extends upwardly within the housing sufficiently to receive the number of filter cartridge assemblies for which the housing is designed (two as depicted in FIGS. 10–13). The threaded shaft passes through a hollow rod 112 from which extend radially three or more centering fins 113. The outermost edges of fins 113 define a diameter corresponding to the inner diameter (at 32) of the retainer ring assemblies 22, which are, in turn, concentric with the central core 18 of each filter cell 12. Accordingly, as the cartridge assemblies 10 are stacked within the housing 28 they become properly aligned.

Interposed between the base plate 110 and the lowermost retainer ring 22 from the lower filter cartridge assembly 10A is flow deflector plate or baffle 114 and the annular gasket 35 from the retainer ring assembly 22, the latter to effect sealing engagement between the central core 18 of the assembly 10A and the outlet pipe 109. The baffle is employed to disperse the inlet stream into the housing and protect the lowermost cell 12 from damage by the influent, which is typically fed in under pressure. The base plate 110 and baffle 114 are appropriately apertured at 116 to allow filtrate to exit from the assemblies 10A and 10B and into the outlet pipe 109.

After the correct number of filter cartridge assemblies 10 have been placed within the housing, a follower tube 118 is placed within the uppermost retainer ring 22 and locking nut 119 is threaded onto the rod 111. Locking nut 119 provides a cage 120 which provides a bore 121 for receipt of the threaded rod 111. The cage provides an extension 122, which fits within the follower tube 118. A compression spring 123 is placed around the extension 122 and is fully compressed within an annular recess 124, when the head of cage 120 is in full contact with the top of the follower tube 118. Spring 123 maintains compression on the stack of cells, which can fluctuate in overall thickness (height) after the cells become wetted. An O-ring 125, is provided within the follower tube 118 sealing the cage extension 122 and follower tube 118 when the locking nut 119 has been secured in place to ensure that the filtered fluid within the central aperture 18 cannot escape into the housing interior 102, but must instead exit from the other end and into the outlet 109.

By torquing the locking nut appropriately, the gasket 35 as well as the gaskets 35 from each of the retainer rings 22 are compressed sufficiently to form a leakproof seal between the assemblies 10A and 10B, the locking nut and the outlet. Locking nut 119 and the accompanying components form a means for effecting a seal 126, at one end of the cell with which it communicates. Such seal is fluid tight and ensures that the fluid entering the central aperture(s) is directed toward the outlet. Finally, the housing 28 provides a fitting 127 for a valve (not shown) to vent air from the sealed housing as fluid is admitted.

For the most part, the foregoing description applies to the existing housing technology and filter cell assemblies. Although six filter cells have been depicting, forming each assembly 10, it is to be understood that the assemblies are not so limited. Typically, an assembly of this type may include eight to 16 cells and again, the use of fewer or more cells is not a factor and thus, in its broadest sense, a cell assembly or filter cell cartridge could comprise only one cell or more than 16.

Figure 12:
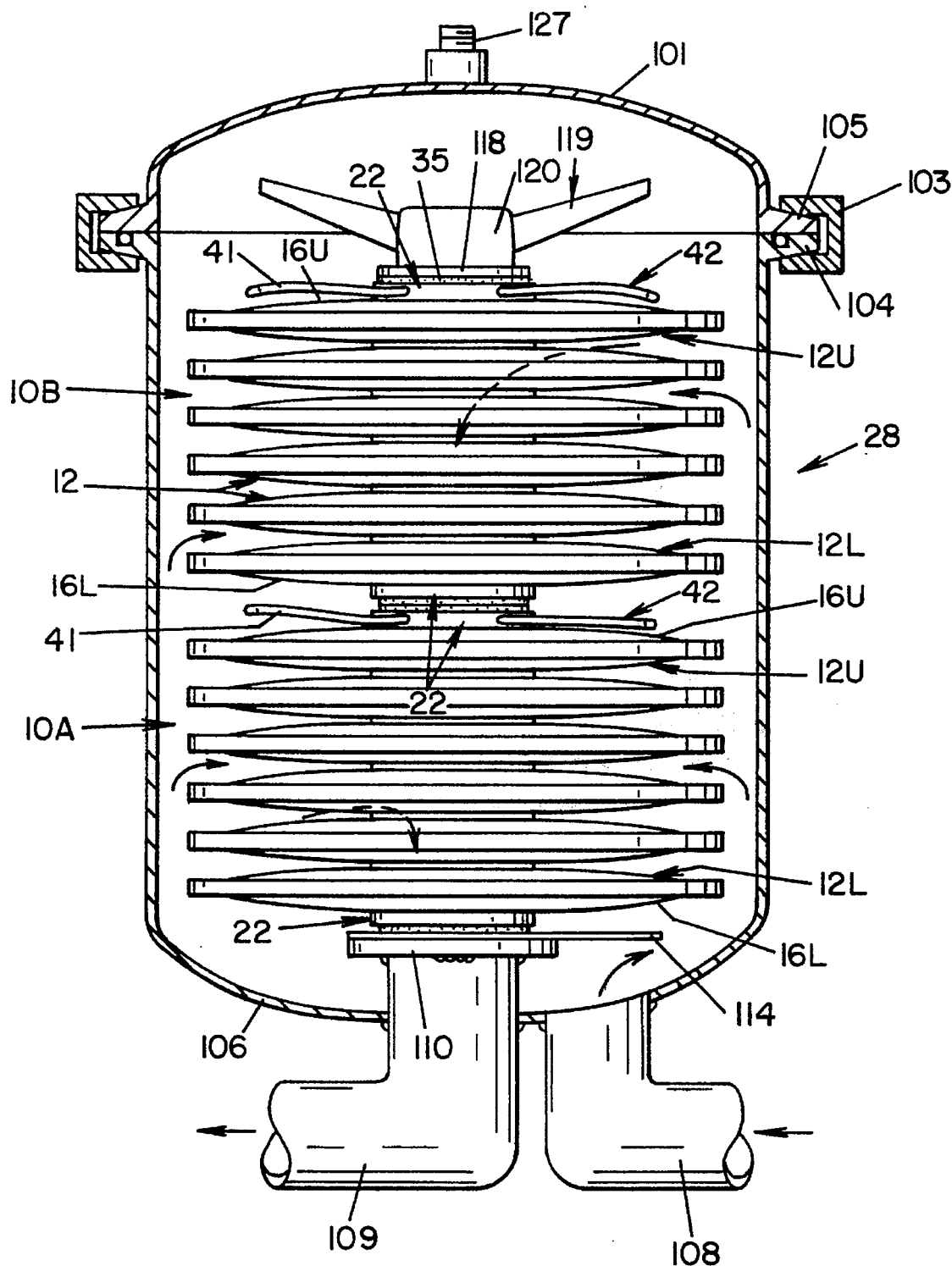
FIG. 12 is a side elevation, partially in section, depicting two filter cell cartridge assemblies within a conventional housing similar to FIG. 10, and depicting handles in communication with the upper retainer ring of each filter cell cartridge assembly.
Figure 13:
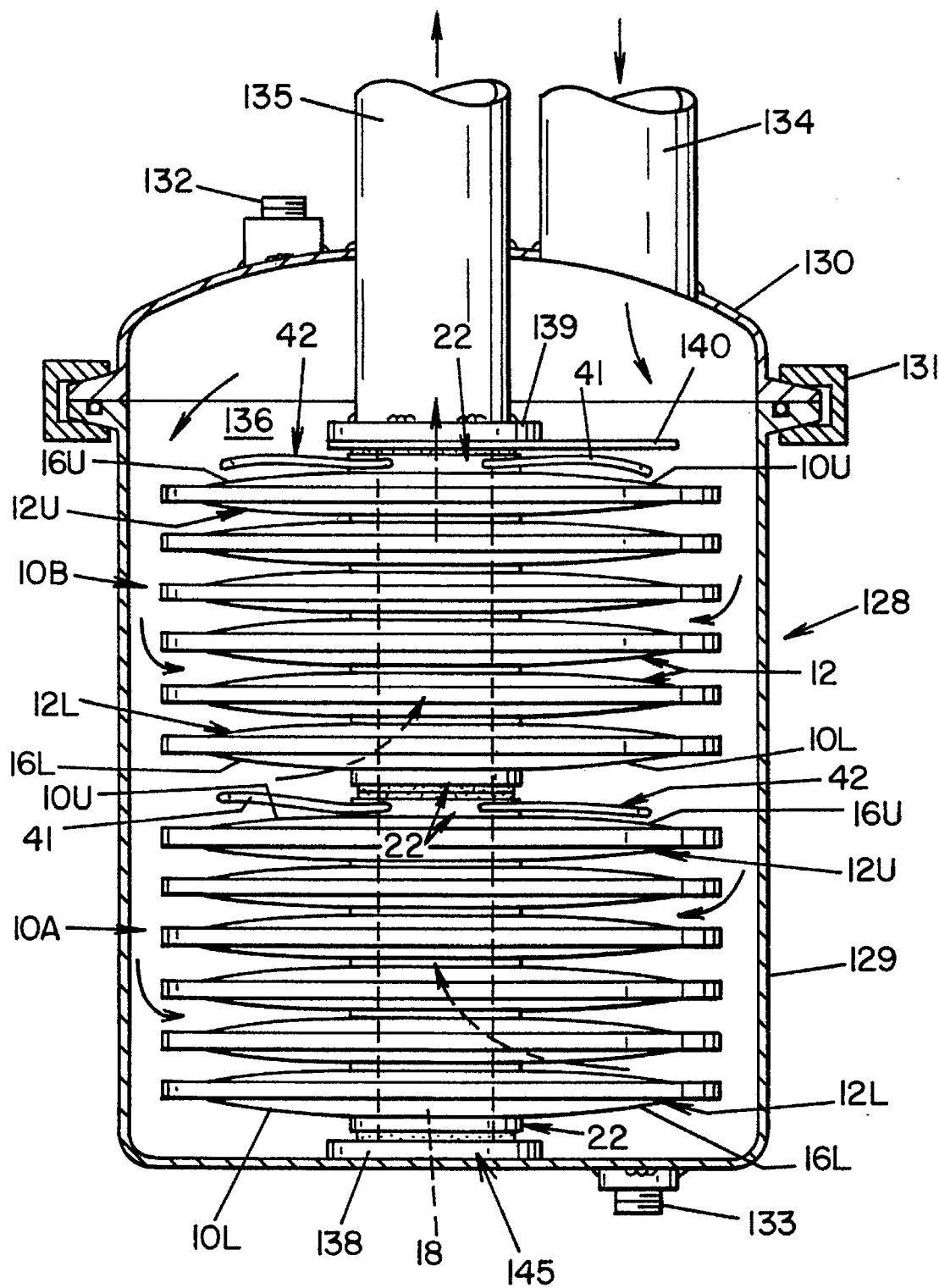
FIG. 13 is a side elevation, partially in section, depicting two filter cell cartridge assemblies within another housing and depicting handles in communication with the upper retainer ring of each filter cell cartridge assembly.

The location of at least two cell assemblies 10A and 10B therein, according to the present invention, is also depicted in FIGS. 11–13 and shall be described next. First, however, it is to be noted that each filter cartridge assembly 10 contains two retainer ring assemblies 22, one at the top of the cartridge, carried by the upper surface 16U, of the uppermost cell 12U in the cartridge, and one at the bottom of the cartridge, carried by the lower surface 16L, of the lowermost cell 12L in the cartridge. Each cartridge 10 within the housing will provide upper and lower retainer ring assemblies 22 in this fashion, irrespective of the number of cartridges actually employed e.g., one, two, three, four or more. Also, in an embodiment where a cartridge comprises but one filter cell 12, the upper surface 16U of that cell 12 will be the upper surface of the cartridge 10U, carrying one of the retainer ring assemblies 22 and likewise, the lower surface 16L of that cell 12 will be the lower surface of the cartridge 10L, carrying the other of the retainer ring assemblies 22.

Bearing the foregoing explanation in mind, in FIG. 11, the lifting means 50, of FIGS. 4 and 5 is depicted. The strap 58 carried by the retainer ring 22 of lower cell assembly 10A, passes upwardly through the central aperture 18 and extends into the aperture 18 of the upper cell assembly 10B. Alternatively, the strap 58 can be tucked within the aperture 18 of lower cell assembly 10A. Similarly, the strap 58 carried by the retainer ring 22 of upper cell assembly 10B, passes upwardly through the central aperture 18 and extends to the follower tube 118 or, it can be tucked within the aperture 18 of the assembly 10B.

When the housing is opened, the locking nut is removed, the first set of lifting straps are grasped and the upper cell assembly 10B can be removed. Next, the lifting straps of lower cell assembly 10A are grasped and it is then removed. Of course, the inlet 108 is first closed and the housing is drained so that no unfiltered fluids can contaminate the flitrate within outlet 109, before the seals are broken and removal of the assemblies commences. After the housing has been serviced as may be necessary, the procedure is reversed with the placement of two fresh assemblies 10, or whatever number the housing accommodates, and the locking nut is affixed, following which the housing is again closed and the fluid flow is resumed.

In FIG. 12, the lifting means 42, of FIGS. 2 and 3 is depicted. The straps 41, carried by the retainer ring 22 of lower cell assembly 10A, lay across the top of the uppermost filter cell 12U without interfering between the seal that needs to be formed between the lower and upper cell assemblies 10A and 10B. Similarly, the straps 41, carried by the retainer ring 22 of upper cell assembly 10B, lay across the top of the uppermost filter cell 12U without interfering between the seal that needs to be formed between retainer ring 22 of the upper cell assemblies 10B and the locking nut 119.

In FIG. 13, the lifting means 42, of FIGS. 2 and 3 has again been depicted; however, the housing is different.

Housing 128 provides a body or sump 129 and a removable cover 130, which is affixed via clamp 131, or other suitable means. The housing 128 provides a fitting 132 for a valve (not shown) to vent air when the fluid is admitted, and a drain 133 for the removal of fluids during cartridge removal. Unlike housing 28, this housing provides inlet and outlet 134, 135, respectively through the top cover, rather than at the base. Within the housing interior 136, is a base plate 138, upon which rests the lower cell assembly 10A in a manner that seals the central aperture 18. A centering rod (not shown) is also provided as described hereinabove.

The outlet 135 carries a compression plate 139 to which is mounted a baffle 140 to diffuse the inlet stream via 134. In order to effect the necessary sealing arrangement within the housing 128, a threaded rod similar to rod 111 within housing 28 can be employed to provide the necessary compression by tightening an engaging nut, appropriately carried above the upper cartridge 10B. In order to simplify the drawings, such mechanism has not been detailed but understandably will function similar to that described in conjunction with FIG. 11. Alternatively, a spring-loaded mechanism (not shown) can be provided between the compression plate 139 and base plate 138 to effect sealing. As shown in FIG. 13, the inlet can be located within the cover 130 at an appropriate dimension to provide sufficient compression of the assemblies as the cover is clamped in place, as will be appreciated by those skilled in the art. Irrespective of the mechanism, base plate 138 forms a means for effecting a seal 145, the functional equivalent of means 126, described hereinabove.

As should now be apparent, the straps 41, carried by the retainer ring 22 of the lower cell assembly 10A, lay across the top of the uppermost filter cell 12U without interfering between the seal that needs to be formed between the lower and upper cell assemblies 10A and 10B. Similarly, the straps 41, carried by the retainer ring 22 of upper cell assembly 10B, lay across the top of the uppermost filter cell 12U without interfering between the seal that needs to be formed between retainer ring 22 of the upper cell assembly 10B and the baffle 140 and compression plate 139.

From the preceding description, it is to be understood that the lifting means provided by the present invention is unique, in part, because it does not interfere with the seal that must be formed between retainer ring assemblies to which the handles are provided in all embodiments other than FIG. 6. Thus, where a seal is formed between the retainer ring carrying the lifting means and the outlet from the housing, the lifting means does not interfere. Similarly, where a seal is formed between the retainer ring carrying the lifting means and an adjacent filter cell or filter cell cartridge assembly 10, the lifting means does not interfere. And, where a seal is formed between the retainer ring carrying the lifting means and the means necessary to seal the central aperture at one end of a filter cell or filter cell cartridge assembly 10, the lifting means also does not interfere. In all instances, there is no risk of contamination between the filtrate stream, passing centrally through the cells and cartridge, and the unfiltered fluid within the housing, caused by the presence of the lifting means.

Thus, it can be seen by those skilled in the art, that the removal of a wet filter cartridge assembly is greatly facilitated by using the present invention. It should also be apparent that the use of an integral or subsequently attached lifting strap provides reduced operator exposure to the fluid stream and contaminants being filtered.

Based upon the foregoing disclosure, it should now be apparent that the use of the devices and the methods described herein will carry out the object set forth hereinabove. It should also be apparent to those skilled in the art that the methods of the present invention can be practiced with a variety of different size filter cartridges and handle configurations.

It is, therefore, to be understood that any variations evident fall within the scope of the claimed invention and thus, the selection of the cartridge assembly and the configuration of the lifting means communicating with the cartridge assembly can be determined without departing from the spirit of the invention herein disclosed and described. Moreover, the scope of the invention shall include all modifications and variations that may fall within the scope of the attached claims.

It is claimed:

1. Removable filter cartridge assemblies for housings having a removable member to provide access to the interior of the housing and an inlet and an outlet to and from the interior thereof comprising:

a plurality of filter cells through which fluids are passed for filtration, each said cell having a central aperture therethrough for the passage of fluid, separate from the fluid within the housing; opposed disks of filtration media, spaced apart and defining upper and lower surfaces of each said cell emanating radially from said central aperture; and, an outer peripheral edge circumscribing each said cell; said central apertures of said cells being contiguously juxtaposed to define an open central core of said cartridge assembly having opposed first and second ends;

first and second retainer ring means carried by said filter cartridge assembly, open to and concentric with said opposed ends of said central core, said first retainer ring means being contiguous with the outlet of the housing; and lifting means communicable with one of said retainer ring means for movement of said filter cartridge assembly into and out of the filter housing.

2. Filter cartridge assemblies, according to claim 1, wherein said second retainer ring means communicates with means effecting a fluid tight seal at one end of said opposed first and second ends of said central core, thereby directing the fluid entering therein to pass through the other of said opposed ends of said core and toward said outlet.

3. Filter cartridge assemblies, according to claim 1, further comprising:

at least one band means for fastening said plurality of cells together.

4. Removable filter cartridge assemblies for housings having a removable member to provide access to the interior of the housing and an inlet and an outlet to and from the interior thereof comprising:

a plurality of filter cartridges, each said cartridge having a plurality of filter cells through which fluids are passed for filtration, said cells having a central aperture therethrough for the passage of fluid, separate from the fluid within the housing; opposed disks of filtration media, spaced apart and defining upper and lower surfaces of said cells emanating radially from said central aperture; and, an outer peripheral edge circumscribing each said cell; said central apertures of said cells being contiguously juxtaposed to define an open central core of said cartridge assembly having opposed first and second ends;

first and second retainer ring means carried by each said filter cartridge, open to and concentric with said opposed ends of said open central cores; said first retainer ring means of each said cartridge being contiguous with said second retainer ring means of an adjacent cartridge, said plurality of cartridges being stacked vertically whereby said contiguous retainer ring means of adjacent cartridges effects a seal for the passage of fluid through each said central core; said first retainer ring means, provided by one of said plurality of cartridges, being contiguous with the outlet of the housing; and lifting means communicable with one of said retainer ring means provided by each of said cartridges for movement of said cartridges into and out of the filter housing.

5. Filter cartridge assemblies, according to claim 4, wherein said lifting means communicates with each said first retainer ring means and comprises at least one handle loop extending therefrom.

6. Filter cartridge assemblies, according to claim 4, wherein said second retainer ring means from one of said cartridges communicates with means effecting a seal at one end of said opposed ends of said central core provided by said cartridge assembly, directing the fluid entering therein to pass through the other of said opposed ends of said core and toward said outlet.

7. Filter cartridge assemblies, according to claim 4, further comprising:

at least one band means for fastening said plurality of cells together.

8. A method for the assembly of a cell-type filter cartridge device disposed within a filter housing having a removable member to provide access to the interior of the housing and an inlet and an outlet to and from the interior thereof, comprising the steps of:

providing at least one filter cartridge assembly through which fluids are passed for filtration, said cartridge providing a plurality of filter cells, each said cell having a central aperture therethrough for the passage of fluid, separate from the fluid within the housing; opposed disks of filtration media, spaced apart and defining upper and lower surfaces of each said cell emanating radially from said central aperture; an outer peripheral edge circumscribing each said cell; said central apertures of said cells being contiguously juxtaposed to define an open central core of said cartridge assembly having opposed first and second ends; and first and second retainer ring means carried by said filter cartridge assembly, open to and concentric with said opposed end of said central core, said first retainer ring means being contiguous with the outlet of the housing;

providing lifting means communicable with one of said retainer ring means for movement of said filter cartridge assembly into and out of said filter housing;

depositing said filter cartridge assembly into said filter housing via said lifting means;

fastening said removable member to said filter housing; and effecting a seal against said second retainer ring means, whereby the fluid within said central core will be directed toward the outlet.

9. A method according to claim 8, including the additional step of interconnecting said filter cells by at least one band to form a stack of cells.

10. A method according to claim 8, including the additional step of providing a plurality of said filter cartridge assemblies, said first retainer ring means of each said cartridge being contiguous with said second retainer ring means of an adjacent cartridge, said plurality of cartridges being stacked vertically whereby said contiguous retainer ring means of adjacent cartridges effect a seal for the passage of fluid through each said central core.

11. A method for removing a filter cell cartridge assembly from a filter housing having a removable member to provide access to the interior of the housing and an inlet and an outlet to and from the interior thereof; the cartridge assembly providing a plurality of filter cells through which fluids are passed for filtration, each said cell having a central aperture therethrough for the passage of fluid, separate from the fluid within the housing; opposed disks of filtration media, spaced apart and defining upper and lower surfaces of said each cell emanating radially from said central aperture and, an outer peripheral edge circumscribing each said cell; said central apertures of said cells being contiguously juxtaposed to define an open central core of said cartridge assembly having opposed first and second ends; and, first and second retainer ring means carried by said filter cartridge assembly, open to and concentric with said opposed ends of said central aperture, said first retainer ring means being contiguous with the outlet of the housing, comprising the steps of:

detaching said removable member from said filter housing;

securing means for lifting to said first retainer ring means; and lifting said filter cartridge assembly out of said filter housing with said lifting means.

* * * * *